Dec. 21, 1965  YOSHINORI KAWAI ETAL  3,225,284
GENERATOR VOLTAGE REGULATING APPARATUS
Filed Nov. 5, 1962  4 Sheets-Sheet 1

Dec. 21, 1965  YOSHINORI KAWAI ETAL  3,225,284
GENERATOR VOLTAGE REGULATING APPARATUS
Filed Nov. 5, 1962 4 Sheets-Sheet 2

(A) OSCILLATOR OUTPUT (B)

(C) ADDITIVE SIDE OUTPUT (at V)

(D) DIFFERENTIAL SIDE OUTPUT (at V)

(E) ADDITIVE SIDE OUTPUT (at Va)

(F) DIFFERENTIAL SIDE OUTPUT (at Va)

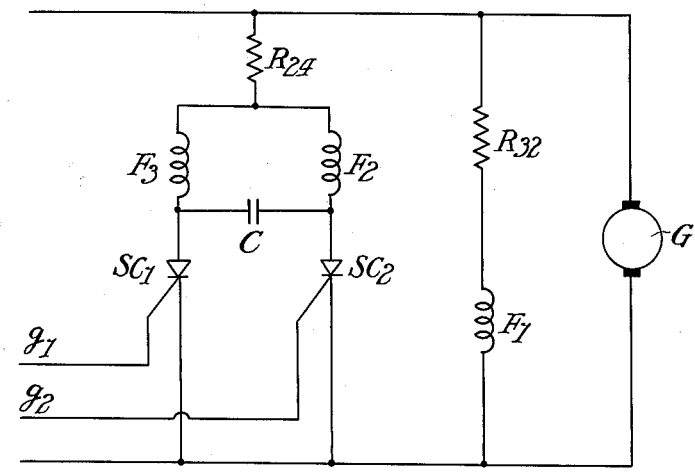
Fig-6-
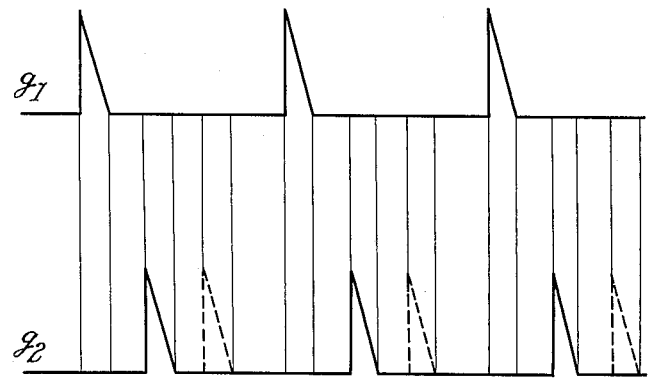
Fig-7-

United States Patent Office 3,225,284
Patented Dec. 21, 1965

3,225,284
GENERATOR VOLTAGE REGULATING
APPARATUS
Yoshinori Kawai, Katsuta-shi, and Takanori Shibata, Hitachi-shi, Ibaragi-ken, Japan, assignors to Kabushiki Kaisha Hitachi Seisakusho, Tokyo-to, Japan, a joint-stock company of Japan
Filed Nov. 5, 1962, Ser. No. 235,371
Claims priority, application Japan, Nov. 6, 1961,
36/39,498, 36/39,499
5 Claims. (Cl. 322—28)

This invention relates to automatic regulation of generator voltages, and more particularly it relates to a new apparatus, wherein semiconductor devices are used, for automatically obtaining constant output voltage from generators having field windings, in spite of variations in the driving speeds of the said generators.

It is a general object of the present invention to solve the problems of deficiencies and resulting unstable operation associated with known apparatuses for automatic regulation of generator voltages, as will be described in detail hereinafter.

It is a specific object of the invention to provide an apparatus for automatic regulation of generator voltage wherein, when the voltage of a generator varies from a pre-set value, this variation is transformed into deviation signals which are in mutually-opposite increasing and decreasing relation, and these signals are respectively applied to two operating elements which are adapted to operate, in effect, in a mutually additive manner on elements which determine field regulation, thereby causing the generator voltage to be returned abruptly to its pre-set value, that is, an apparatus with extremely high response.

It is another object of the invention to provide an apparatus for automatic regulation of generator voltage wherein a semiconductor switching element which is connected in series with a generator field winding is driven, by pulse-duration-modulated signals, from completely conductive state to completely cut-off state, the said pulse-duration-modulated signals having variations nearly proportional to the square of the variation of erroneous voltage of the generator output voltage, whereby high response speed is obtained through the use of a semiconductor switching element of low capacity.

It is still another object of the invention is provide a circuit arrangement suitable for the changing of the above said semiconductor switching element connected in series to a generator field winding from the fully conductive state to fully shut-off state.

It is a further object of the invention to provide an apparatus for automatic regulation of generator voltage wherein, in the case of a generator having differential and cumulative field windings, semiconductor switching elements are respectively connected in series to the windings, and the said semiconductor switching elements are controlled to undergo periodic, "ON"–"OFF" operations during only mutually-opposite periods by signals which have been pulse-duration-modulated by erroneous voltages of the generator output.

And, it is a further object of this invention to provide an apparatus for automatic regulation of generator voltage wherein, in the case of periodic, "ON"–"OFF" operation, the pulse-duration-modulated signal is produced by the following apparatus; that is, a periodic pulse generator, a circuit wherein the said pulse is supplied to a parallel circuit of a controllable impedance means and a capacitor, and a Schmidt circuit for detecting the terminal voltage of the said capacitor, and the said controllable impedance means is controlled in response to the erroneous signal of the output voltage of the generator.

The nature, principle, and details of the invention, as well as the manner in which its afore-stated objects may best be achieved will be more clearly apparent by reference to the following detailed description when taken in conjunction with the accompanying illustrations in which like parts are designated by like reference numerals, and in which:

FIG. 6 is a circuit diagram showing another specific embodiment of the apparatus according to the invention; and FIG. 7 shows a waveform diagram of controlling gating pulses which is adapted to the gate of the semiconductor rectifier with control electrodes.

Figure 1:
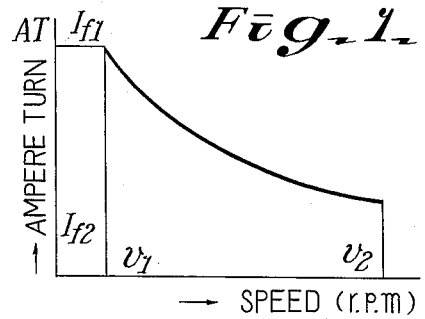
FIG. 1 is a graphical representation indicating the relationship between field ampere-turns and rotational speed for obtaining constant voltage.

The graphical representation shown in FIG. 1 indicates the relationship, in a generator wherein the driving speed varies, between field ampere-turns required with a given driving speed for maintaining the generator terminal voltage at a constant value. This graph indicates that, at a high driving speed $v_2$, a field ampere-turns value of only $I_{f2}$ is sufficient, and when the driving speed is reduced to $v_1$, the field ampere-turns must increase to a value $I_{f1}$.

Figure 5:
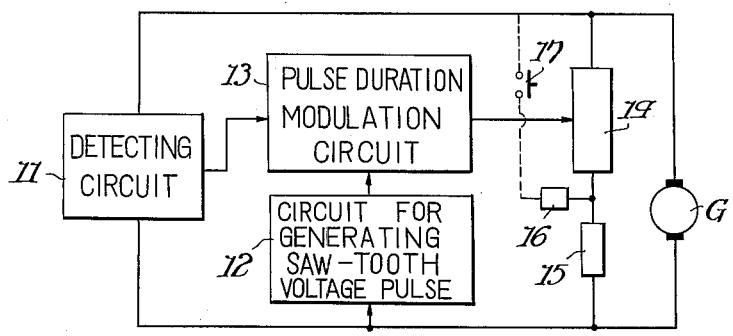
FIG. 5 is a block diagram indicating the circuit composition of a conventional apparatus.

Heretofore, in order to satisfy the above-stated requirement, such a circuit arrangement as is indicated by the block diagram of FIG. 5 has been used. This circuit comprises, essentially, an erroneous voltage detecting circuit 11 for detecting errors in the voltage of the generator output, a circuit 12 for generating a saw-tooth voltage pulse, a pulse duration modulation circuit 13 for varying the duration of the output pulse in response to the output of the detecting circuit 11, an output amplifier and switching element 14, the generator field winding 15, a voltage establishing circuit 16, a push-button switch 17, and the generator armature G.

The operation of this circuit, which is described in detail in Japanese Patent No. 269,519, will now be described briefly. When, by means of the push-button switch 17, the voltage establishing circuit 16, which contains a storage cell and other elements, is connected to the field winding 15 to form a closed circuit, a generator output voltage appears. The circuit 12 is continually generating a saw-tooth voltage pulse of constant period, and the output of the erroneous voltage detecting circuit 11 and the saw-tooth pulse are superimposed and applied to a comparison circuit which has a constant performance level, whereby a pulse-duration-modulated output is obtained from the pulse duration modulation circuit 13. The on-off control of the amplifier and switching element 14 is accomplished by means of this output pulse, and the mean current of the field winding 15 is regulated, whereby the output voltage of the generator G is maintained of a constant value.

By the use of such a circuit arrangement as is described above, voltage regulation with substantially good efficiency is possible. However, in such cases as, for example, large-capacity generators for installation on wheeled vehicles, wherein control of relatively high field power, wide regulation range, and, moreover, a high response are required, conventional circuit arrangements of this type have, heretofore, been unsatisfactory on the point of the control element capacity. Therefore, in such an arrangement, it is difficult to achieve satisfactory on-off operation.

Figure 2:
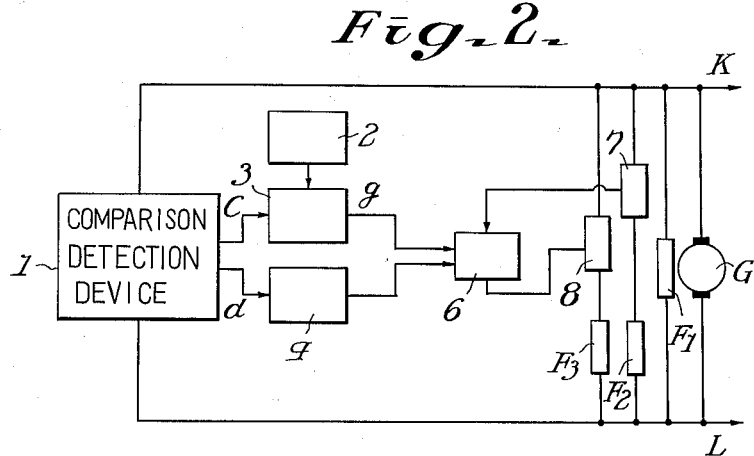
FIG. 2 is a block diagram indicating the circuit composition of the apparatus according to the invention.

In the apparatus according to the present invention, as indicated in outline form by the block diagram shown in FIG. 2, the above-mentioned problem has been solved, and the apparatus may be applied to the regulation of the output voltage of a direct-current generator G supplying power to a load (not shown) such as, for example, a storage battery, which is connected across its output terminals K and L. A stationary field winding $F_1$, a cumulative winding $F_2$, and differential winding $F_3$ are connected across the terminals of the generator G. In addition, the circuit is composed of a comparison detecting device 1, a constant-period pulse oscillator 2, phase-adjusting element 3, an element 4 for determining the performance level (voltage) of an element 6 for determining the field regulation quantity, an element 8 for regulating the differential field quantity, and an element 7 for regulating the cumulative field quantity.

The various elements of the above-described circuit have the following functions. The generator terminal (output) voltage is applied to the comparison detecting device 1, and its deviation from a predetermined value is obtained at the device 1 in two forms which are in mutually-opposite increasing and decreasing relation. That is, if the predetermined value is denoted by $V_r$, and the generator terminal voltage is denoted by VG, one of the said forms will be a deviation which is in accordance with $(V_r-V_G)$, and the other form will be a deviation which is in accordance with $(VG-V_r)$. These deviations are led out of terminals c and d as $V_c$ and $V_d$, respectively. Although, for the comparison detecting device 1, such circuits as, for example, a bridge detecting circuit, are relatively simple, other known devices can be used. The oscillator 2 is a device for generating pulse output having constant spacing, and, for example, its function can be fulfilled through the use of a blocking oscillating device. The phase-adjusting element 3, which is composed of capacitors and a controllable-impedance device, performs repetitions of a cycle consisting of being charged by a constant-period pulse from the oscillator 2 and discharging in the period prior to the instant of generation of the succeeding pulse. The controllable impedance device is inserted in the discharge circuit of the element 3 and has also the function of varying the discharge times of the capacitors. The afore-mentioned deviation $V_c$ of the comparison detecting device 1 is introduced to the control terminal of this controllable impedance.

The element 4, which is a controllable impedance device controlled by the afore-mentioned deviation $V_d$, has an operation which is opposite that of the controllable impedance device used in the element 3 and has the function of controlling the determination quantity of the element 6 for determining the field regulation. This determination element 6 is a device which determines the time instant, within the determined period cycle, from which the field regulating device is operated. A significant point here is that the effects of the controllable impedances used in the devices 3 and 4, which are respectively controlled by the oppositely increasing and decreasing deviations $V_c$ and $V_d$, operate in a mutually additive or mutually multiple manner on the determination of the above-mentioned time instant.

That is, when this time instant is to be advanced, both operate in a mutually additive manner to advance the instant increasingly, and when the instant is to be retarded, both operate in a mutually additive manner to retard the instant increasingly. This has an effect as follows: for example, when the controllable impedance inserted in the discharge circuit of a condenser exhibits a high impedance value, and the time for the terminal voltage to reach a certain voltage V becomes retarded, the variable impedance device within the device 4 exhibits a low impedance value, which, acting on the determination element 6, operates to lower the aforesaid voltage V to a voltage $V_a$, and the time required for the terminal voltage of the capacitor to reach this voltage $V_a$ becomes increasingly longer.

The element 6 can be formed from a Schmidt circuit and produces two output signals. If the period of the oscillator 2 is denoted by $t$, and the determination instant of the determination element by $T_i$, one of the outputs of the element 6 continues to be produced during the interval $T_1$, and the other output continues to be produced during the interval $t-T_i$. Both outputs are never produced simultaneously.

The elements 7 and 8 are regulating devices respectively connected in series with the cumulative and differential field windings and repeat on-off operation. When the element 7 is in the "ON" state during the interval $T_1$, the element 8 is in the "OFF" state; and when the element 7 is in the "OFF" state, the element 8 is in the "ON" state. The period of either of the on and off operations is the same as the oscillator output period $t$. The elements 7 and 8 are made up of semiconducor switching devices, for example, transistors or semiconductor rectifiers with control electrodes.

The operation of the above-described apparatus according to this invention, as illustrated in FIG. 2, will now be described with reference to the waveform time charts of FIG. 3.

Figure 3:
FIG. 3 shows waveform diagrams of various parts of an apparatus according to the invention which are presented for a description of the operation of the apparatus of this invention.
Figure 3:
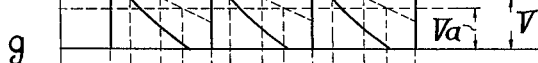
Figure 3:
Figure 3:
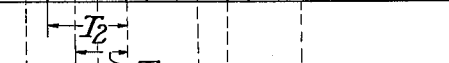
Figure 3:
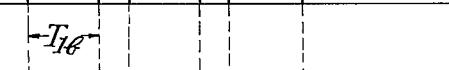
Figure 3:
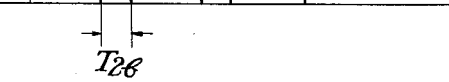

The oscillator 2 produces a pulse output as indicated by waveform (A) in FIG. 3. The output g of the phase-adjusting device 3 assumes a triangular shape as indicated by waveform (B). This will be apparent from the fact that the terminal voltage of a capacitor which is charged and discharged is made to be the output g. If the impedance value of the variable impedance inserted in the discharge circuit of the capacitor varies, the slope of the triangular waveform of the output g will vary.

The case wherein the driving speed of the generator has decreased, and the terminal voltage VG has become lower than a predetermined value $V_r$ will now be considered. The deviation $\Delta V_c$ corresponding to the difference $VG - V_r$ increases and causes an increase in the impedance value of the controllable impedance device of the device 3, whereby the triangular waveform of the output g varies from the full-line shape to the dot-line shape. At this time, the deviation $\Delta V_d$ corresponding to the difference $V_r - V_G$ decreases and operates on the device 4, thereby causing the determination voltage V of the determination element 6 to be reduced to $V_a$.

When the output g is being produced according to the full line shown in waveform (B), the time for the triangular waveform to reach the determination voltage V is $T_1$. For this reason, as described hereinbefore, a rectangular waveform current having a width $T_1$ flows in the cumulative field winding as indicated by waveform (C) in FIG. 3, and a rectangular waveform current having a width $T_2$ flows in the differential side as indicated by waveform (D). (Here, $T_1+T_2=t$.)

When the variable impedance within the device 3 is caused by the rise in the terminal voltage to increase, and the wave-form of the output g becomes that indicated by the intermittent curve, the time to reach the determination voltage V increases to $T_{1a}$, the flow period of the cumulative side increases to $T_{1a}$, and the flow time width of the differential side decreases to $T_{2a}$. (Here, $T_{1a}+T_{2A}=t$.) Since, at the same time, the device 4 operates, and the determination voltage of the device 6 is reduced from V to $V_a$, the time for the triangular waveform of g to reach $V_a$ increases to $T_{1b}$, and, as is indicated in waveforms (E) and (F), the flow time width of the cumulative side increases to $T_{1b}$, and the flow time width of the differential side decreases to $T_{2b}$. That is, the oppositely increasing and decreasing deviations $\Delta V_c$ and $\Delta V_d$ operate in a mutually additive manner, as a net effect, whereby a great control effect is obtained.

In the case wherein the oscillator output frequency is, for example, 1 kilocycle per second, control variations are accomplished, within 1 millisecond in response to fluctuation in the generator voltage, to a substantial degree as indicated in FIG. 3. Accordingly, it will be apparent that the control effectiveness is extremely high. Moreover, since the cumulative and differential sides have mutually opposite effects, the total effect upon the field ampere-turns of the generator is two or more times the variation of each of the cumulative and differential sides.

Figure 4:
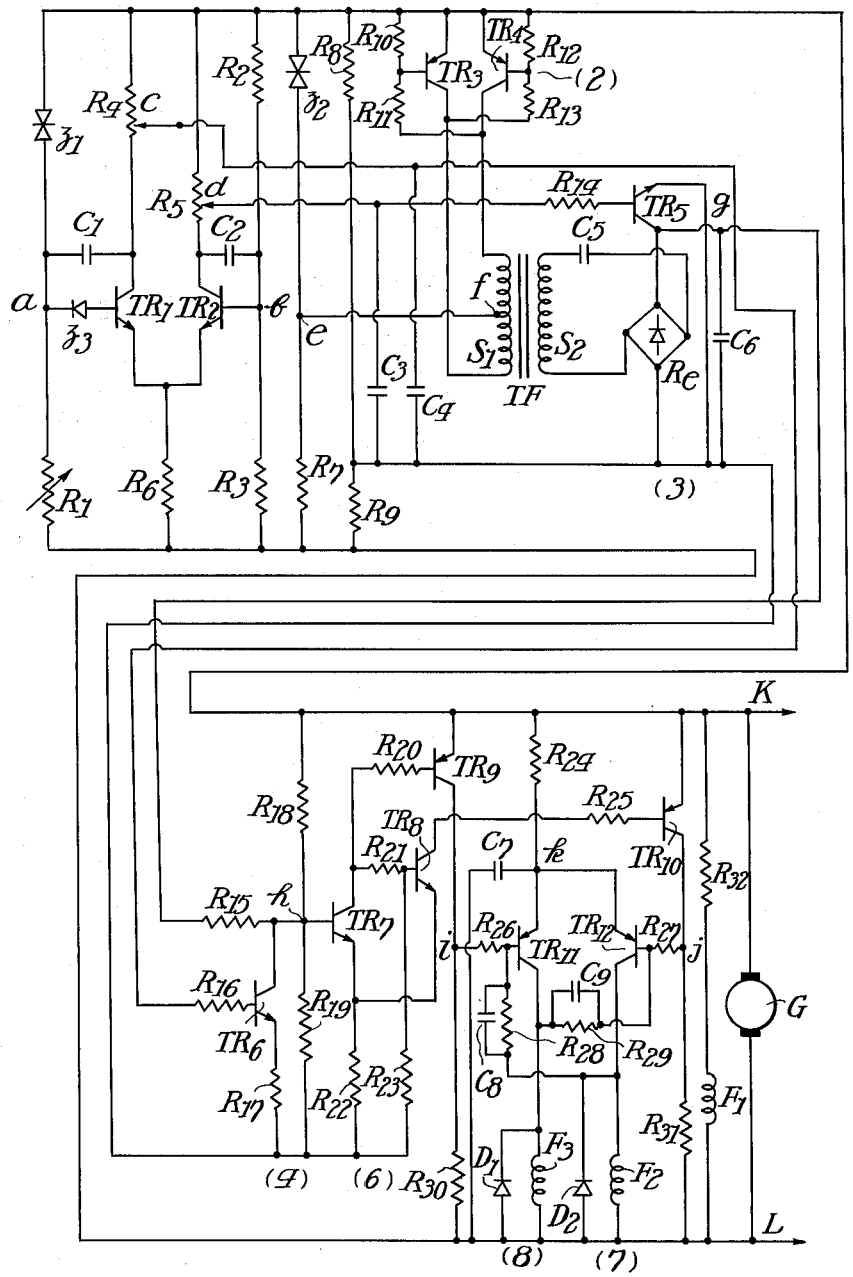
FIG. 4 is a circuit diagram showing a specific embodiment of the apparatus according to the invention.

A specific embodiment of the invention which is reduced to a practical form, and in which transistors are used as semiconductors, is indicated by the circuit diagram of FIG. 4. The sections of this apparatus corresponding to the elements 1 through 8 of FIG. 2 are respectively designated by reference symbols (1) through (8). The circuit of this apparatus is composed of: transistors $TR_1$ through $TR_{12}$ of either p-n-p type or n-p-n type; resistances $R_1$ through $R_{32}$ of fixed, variable, or potentiometer type; the potentiometer resistances having variable lead-out terminals; capacitors $C_1$ through $C_9$; Zener diodes $z_1$, $z_2$, and $z_3$; a saturable iron core TF; a full-wave rectifier $R_e$; a basic exciting field winding $F_1$; a cumulative field winding $F_2$; and a differential field winding $F_3$.

The diode $z_1$ and resistances $R_1$, $R_2$, and $R_3$ form a bridge. The detecting terminals $a$ and $b$ of this bridge are connected, respectively, to the bases of the transistors $TR_1$ and $TR_2$, which are connected as a differential amplifier. The diode $z_3$ is connected to the base of the transistor $TR_1$ in order to increase the detecting sensitivity. The potentiometer resistance $R_4$ and $R_5$ are connected, as loads, to the collector sides of the transistors $TR_1$ and $TR_2$, respectively. The capacitors $C_1$ and $C_2$ are connected across the base and collector sides of the transistors $TR_1$ and $TR_2$ for the dual purpose of increasing detecting sensitivity and protecting the transistors $TR_1$ and $TR_2$. Because of consideration for temperature effects, twin type diodes are used in the case of the diodes $z_1$ and $z_2$.

In the circuit arrangement as above-described, when the diode $z_3$ is neglected, the voltage $V_a$ of the point $a$ has the value $V_a = V_G - V_{z1}$, where $V_G$ is the generator voltage, and $V_{z1}$ is the Zener voltage of the diode $z_1$; and the voltage $V_b$ of the point $b$ becomes $$V_b = V_G \times \frac{R_3}{R_2 + R_3}$$

The voltage $V_c$ and $V_d$ appearing at the lead-out points $c$ and $d$ of the potentiometer resistances $R_4$ and $R_5$ have the following relationship.

$$V_d \cong K(V_a = V_b)$$
$$= K\left(V_G - V_{z1} - V_G \frac{R_3}{R_2 + R_3}\right)$$
$$= K\left(V_G \frac{R_2}{R_2 + R_3} - V_{z1}\right)$$

When only the variations are considered, $\Delta V_c = \Delta V_d$; wherefore, the fluctuations of the terminal voltages appear as mutually opposite increase and decrease. In the above equations, K is a constant; and when the Zener voltage $V_{z3}$ is selected to below, $\Delta V_d$ appears immediately when the deviation exceeds $V_{z3}$.

The emitters of the transistors $TR_3$ and $TR_4$ are commonly connected, and their collectors are connected to the two ends of the primary winding $S_1$ wound about the saturable core TF, the connections being so adapted as to establish a base potential by mutual potential division of the potential of the mutually opposite collector by means of the resistances of $R_{10}$, $R_{11}$ and $R_{12}$, $R_{13}$. When a voltage is impressed across the emitters of the transistors $TR_3$ and $TR_4$ thus connected and the center point $f$ of the primary winding $S_1$, the transistors $TR_3$ and $TR_4$ are caused to undergo on-off repetitions at a frequency determined by the winding turns of the winding $S_1$, the saturation magnetic flux of the core, and the impressed voltage value, and a rectangular-wave voltage appears in the secondary winding $S_2$ of the core TR. Since this is a well-known operational result, a detailed description thereof will be omitted here.

In the instant embodiment, the generator terminal voltage is divided by means of the diode $z_2$ and resistance $R_7$, the junction between which, $e$, is connected to the point $f$ so as to cause the Zener voltage $V_{z2}$ to be impressed across the common emitters of the transistors $TR_3$ and $TR_4$. Since voltage $V_{z2}$ is a constant voltage, a rectangular waveform voltage of constant frequency appears in the secondary winding $S_2$ about the saturable core TF.

This rectangular waveform is differentiated by means of the capacitor $C_5$, and the differentiated wave (in pulse form) is full-wave-rectified by the rectifier $R_e$, whereupon a pulse voltage as indicated by waveform (A) in FIG. 3 appears at the direct-current end of the rectifier $R_e$.

The deviation $\Delta V_d$ of the comparison detecting section is passed through the resistance $R_{14}$ to be impressed on the base of the transistor $TR_5$ of the controllable impedance device. The oscillator output is impressed on the two terminals of the capacitor $C_6$, to which are connected, as a discharge circuit, the collector and emitter of the transistor $T_5$, to which a suitable energizing potential has been imparted by means of the resistances $R_8$ and $R_9$. The transistor $TR_5$ and capacitor $C_6$ form the phase-adjusting device 3. The potential $V_g$ of the teminal $g$ of the capacitor $C_6$, which is charged by the output of the rectifier $R_e$ and discharges through the transistor $TR_5$, assumes a triangular waveform as indicated by waveform (B) in FIG. 3. The slope of this waveform varies in accordance with the impedance between the emitter and collector of the transistor $TR_5$, for example, as indicated by the slanting dot-line in (B) of FIG. 3.

The point $g$ is connected by way of the resistance $R_{15}$ to the base of the transistor $TR_7$. The element 6 for determining the field regulation quantity is formed from an ordinary Schmidt circuit wherein transistors $TR_7$ and $TR_8$ are connected to a common resistance $R_{22}$, and the collector of the transistor $TR_7$ is connected by way of a resistance $R_{21}$ to the base of the transistor $TR_8$. When the transistor $TR_7$ is in the "ON" state, the transistor $TR_8$ is in the "OFF" state; and when the transistor $TR_7$ is in the "OFF" state, the transistor $TR_8$ is in the "ON" state. When the base potential of the transistor $TR_7$ is higher than the emitter potential, that is, the potential V of the two terminals of the resistance 22, the transistor $TR_7$ is "ON," and the transistor $TR_8$ is "OFF." When the base potential of the transistor $TR_7$ becomes lower than the emitter potential, the state of the transistor $TR_7$ changes to "OFF," and that of the transistor $TR_8$ changes to "ON." Therefore, the voltage V appearing at the two terminals of the resistance $R_{22}$ may be considered to be a voltage for determining the states of the transistors $TR_7$ and $TR_8$.

Since the point $g$ is connected to the base of the transistor $TR_7$, when the voltage $V_g$ is higher than the voltage V, that is, during the interval $T_1$, the transistor $TR_7$ is "ON"; and when $V_g$ is lower than V, that is, during the interval $T_2$ as indicated in FIG. 3 (B), (C), and (D), the transistor $TR_7$ is "OFF," and the transistor $TR_8$ is "ON."

The point $c$ at which the deviation $\Delta V_c$ of the comparison detecting section appears is connected by way of the resistance $R_{16}$ to the base of the controllable impedance $TR_6$ functioning as the adjusting device 4 of the determination element 6. The collector and emitter of the transistor $TR_6$ are connected, respectively, to the base of the transistor $TR_7$ and, by way of the resistance $R_{17}$, to the end of the resistance $R_{22}$ away from that end connected to the emitter of the transistor $TR_7$.

The impedance variation of the transistor $T_6$ corresponds to the deviation $\Delta V_c$ and, in net effect, operates to cause the state-determining voltage V of the transistors $TR_7$ and $TR_8$ to vary in a substantially linear manner. That is, as indicated in FIG. 3 (B), the said impedance variation of the transistor causes the voltage V to change to Va. The function of the resistances $R_{18}$ and $R_{19}$ is to determine the bias of the base of the transistor $TR_7$. The transistors $TR_9$ and $TR_{10}$ constitute a device for amplifying the outputs of the transistors $TR_7$ and $TR_8$, the transistors $TR_9$ and $TR_{10}$ being controlled by the transistors $TR_7$ and $TR_8$, respectively.

The transistors $TR_{12}$ and $TR_{11}$ correspond, respectively, to the afore-mentioned switching devices 7 and 8 for regulation of the fields of the cumulative and differential sides, and the emitters and collectors of the transistors $TR_{12}$ and $TR_{11}$ are respectively connected, together with a commonly connected resistance $R_{24}$, in series with the cumulative and differential windings $F_2$ and $F_3$.

Furthermore, the bases of the transistors $TR_{11}$ and $TR_{12}$ are connected, respectively, to the collectors of the transistors $TR_9$ and $TR_{10}$ and respectively undergo "OFF"–"ON" operation in response to the "ON"–"OFF" operation of the transistors $TR_9$ and $TR_{10}$. In order to provide higher accuracy and reliability in the above-described operation of the transistors $TR_{11}$ and $TR_{12}$, the potential of the collector of each said transistor is fed back by way of a parallel connection of a capacitor and a feed-resistance ($C_8$ and $R_{28}$, $C_9$ and $R_{29}$) to the base of the other said transistor, whereby a multivibrator is formed as a total effect.

The transistors $TR_{11}$ and $TR_{12}$ are protected by a capacitor $C_7$ connected commonly to their emitters. Diodes $D_2$ and $D_1$ are connected across the terminals of the windings $F_2$ and $F_3$, respectively, for the purpose of absorbing reverse induced voltage created simultaneously with suppression of current flow through the windings $F_2$ and $F_3$. The resistance $R_{24}$ is selected with due consideration of the voltage-withstanding characteristics of the transistors $T_{11}$ and $T_{12}$, but even when the transistors alternate and repeat "ON"–"OFF" operations, a constant current flows continually through this resistance $R_{24}$. For this reason, the voltage drop created in the resistance $R_{24}$ is continually applied as a suitable reverse voltage across the emitter and base of the transistor which is in the "OFF" state, whereby it is possible to attain almost perfect "ON"–"OFF" operation of the transistors $TR_{11}$ and $TR_{12}$.

Capacitors $C_3$ and $C_4$ are connected to the bases of the transistors $TR_5$ and $TR_6$ in order to impart smooth characteristics to the deviation voltages $\Delta V_c$ and $\Delta V_d$ which are applied to the said bases but are not absolutely necessary in all cases. The ampere-turns of the basic excited field $F_1$ are determined by selecting or adjusting the resistance $R_{32}$, consideration being given to the driving speed of the generator G.

The operation of the instant apparatus embodying the invention will now be considered below with the supposition that, when the generator voltage $V_G$ is being maintained at the required value by the operations of the cumulative and differential windings, as indicated by the full lines in FIG. 3, the driving speed of the generator decreases, and the voltage $V_G$ drops below the said required value.

When the voltage $V_G$ decreases, the current passed through the transistor $TR_2$ becomes high, and the transistor $TR_1$ assumes its non-conductive state. Consequently, the potential $V_d$ of the point $d$ of the resistance $R_5$ decreases, and the potential $V_c$ increases, thereby causing the impedance of the transistor $TR_5$ to become large and the impedance of the transistor $TR_6$ become small. As a result, as indicated in FIG. 3 (B), (E), and (F), the waveform of the potential $V_g$ of the point $g$ becomes that shown by full line, and the determination potential V is reduced to $V_a$. Accordingly, the "ON" time interval of the transistor $TR_7$ becomes long, and that of the transistor $TR_8$ becomes short. This result is transmitted also to the transistors $TR_9$ and $TR_{10}$, wherefore, when the transistor $TR_9$ is "ON," the base potential of the transistor $TR_{11}$ is high, and the transistors $TR_{11}$ and $TR_{12}$ are "OFF" and "ON," respectively. Consequently, the time intervals, as indicated in FIG. 3 (E) and (F), become such that the interval of the cumulative side is lengthened to $T_{1b}$ and that of the differential side is shortened to $T_{2b}$, and the field ampere-turns are increased, whereby the generator voltage is raised to the required value.

Also in the case when the generator voltage rises above the required value, the field current is regulated in a similar manner.

A part of another specific embodiment of the invention, in which semiconductor rectifiers with control electrodes are used, as indicated by the circuit diagram of FIG. 6, and its operation is explained by referring to wave form diagrams of FIG. 7. In the circuit diagram of FIG. 6, a pair of semiconductor rectifiers with control electrodes, for example, $SC_1$, $SC_2$, are connected to differential winding and cumulative winding respectively in series, and a capacitor is connected across the anodes of said semiconductor rectifiers with control electrode.

In this configuration, the controlled electrodes of $SC_1$, $SC_2$ are supplied with a set of pulses $g_1$ and $g_2$ respectively as shown in FIG. 7.

Accordingly, $SC_1$ and $SC_2$ are driven at first to conductive state and then to nonconductive state, alternately. If there is a deviation of the output voltage of the generator from a predetermined value, the phases of the pulses $g_1$ are shifted as shown in dotted lines, in response to the said deviation signal, and the flow time width of $SC_1$ and $SC_2$ are changed; as a result, the output voltage of the generator is maintained at a constant value.

While the foregoing description has disclosed an embodiment having a plurality of field windings and their regulating devices, it will be apparent to persons skilled in the art that the apparatus of this invention can be utilized for generator voltage regulating systems consisting of only an ordinary single-field regulating device to produce excellent control results. Furthermore, even if "ON"–"OFF" operations are not repeated at constant frequency, the extraction of two comparison detection signals produces excellent results also in the case when continuous variations occur.

Although this invention has been described with respect to a particular embodiment thereof, it is not to be so limited as changes and modifications may be made therein which are within the full intended scope of the invention, as defined by the appended claims.

What is claimed is:

1. A generator voltage regulating apparatus which comprises, in electrical connection with a generator having a field winding, a field regulating means including a semiconductor switching element connected in series to the said field winding, a comparison detecting means which, when a deviation from a predetermined voltage value occurs in the terminal voltage of the said generator, generates, in accordance with the magnitude of the said deviation, two comparison detection signals having mutually-opposite increasing and decreasing characteristics, a circuit for generating periodic, pulse-form voltage, a circuit wherein the said pulse-form voltage is applied through a controllable impedance means to charge a capacitor, and a controllable determination element for detecting the terminal voltage of the said capacitor and generating rectangular output pulse, and which is so adapted that one of the said two comparison detection signals is applied to the said controllable impedance means, and the other is applied to the said controllable determination element so as to cause the said two signals to operate in mutual response, and the said semiconductor switching element is controlled by the output of the said controllable determination element.

2. A generator voltage regulating apparatus which comprises, in electrical connection with a generator having a field winding, a field regulating means including a semiconductor switching element connected in series to the said field winding, a comparison detecting means which, when a deviation from a pre-set voltage value occurs in the terminal voltage of the said generator, generates, in accordance with the magnitude of the said deviation, an output signal, an oscillation means for generating periodic pulse, a circuit wherein the said pulse is supplied to a parallel circuit of a controllable impedance means and a capacitor, and a Schmidt circuit for detecting the terminal voltage of the said capacitor, and which is so adapted that the said controllable impedance means is controlled in response to the said output signal, and the said semiconductor switching element is controlled by the output of the said Schmidt circuit.

3. A generator voltage regulating apparatus comprising, in electrical connection with a generator having a field winding, a field regulating device of multivibrator type with one of its semiconductor switching elements connected to the said field winding and driven to undergo periodic ON–OFF operation, a comparison detecting means which, when a deviation from a predetermined voltage occurs in the terminal voltage of the said generator, generates, in accordance with the magnitude of the said deviation, two comparison detection signals having mutually-opposite increasing and decreasing characteristics, and regulating means for operating in response respectively with the said comparison detection signals, the said regulating means being adapted to operate, in effect, in a mutually-additive manner on the said field regulating device.

4. A generator voltage regulating apparatus which comprises, in electrical connection with a generator having a field winding, a field regulating device of multivibrator type with one of its semiconductor switching elements connected to the said field winding, a comparison detecting circuit of differential amplifier type connected across the generator terminals and including an internal reference voltage therewithin, an oscillation means for generating a periodic pulse output, a circuit wherein the said periodic pulse output is supplied to a parallel circuit of a transistor and a capacitor, and a Schmidt circuit connected to the two ends of the said capacitor, and which is so adapted that the internal impedance of the said transistor is controlled in response to the output of the said comparison detecting circuit, and the field regulating device of multivibrator type is controlled by the output of the said Schmidt circuit.

5. A generator voltage regulating apparatus which comprises, in electrical connection with a generator having a field winding, a field regulating device of multivibrator type with one of its semiconductor switching elements connected to the said field winding, a comparison detecting circuit of differential amplifier type connected across the generator terminals which includes an internal reference voltage element therewithin and generates two comparison detection signals of mutually-opposite increasing and decreasing characteristics, an oscillation means for generating periodic pulse output, a circuit wherein the said periodic pulse output is supplied by way of a first transistor to a capacitor, a second transistor connected across the terminals of the said capacitor, and a Schmidt circuit operated by the voltage between the collector and emitter of the said second transistor, and which is so adapted that the said first and second transistors are respectively controlled by the output of the said comparison detection circuit of differential amplifier type, and the said field regulating device of multivibrator type is controlled by the output of the said Schmidt circuit.

References Cited by the Examiner

UNITED STATES PATENTS 2,896,148    7/1959    Terry et al. _____ 322—64

MILTON O. HIRSHFIELD, *Primary Examiner.*

LLOYD McCOLLUM, *Examiner.*